Patented June 13, 1933

1,914,222

UNITED STATES PATENT OFFICE

ROBERT SETH TAYLOR, OF BRONX, NEW YORK, ASSIGNOR TO ELECTROLUX SERVEL CORPORATION, OF NEW YORK, N. Y., A CORPORATION OF DELAWARE

REFRIGERATION

No Drawing.   Application filed April 24, 1928.  Serial No. 272,562.

My invention relates to compositions of matters or groups of substances for use in refrigeration systems. In particular, my invention consists in a new group of substances or composition for such use including ethylene glycol as absorption liquid or included in an absorption liquid for absorbing a refrigerant in refrigerating systems of the absorption type.

I have determined that the addition of ethylene glycol to refrigerating apparatus of the absorption type gives unusual and unexpected results. This substance has particular advantages in systems of the Electrolux type wherein a pressure equalizing auxiliary fluid is used, in the presence of which the refrigerant evaporates and which is circulated between the evaporator and absorber of the system.

My invention includes also refrigerating compositions comprising methylamine as a refrigerant and ethylene glycol used partly or wholly as absorption liquid.

The use of ethylene glycol gives lower vapor pressure of the solvent. This reduces rectifier losses. The reduction of vapor pressure of the solvent also reduces the amount of refrigerant which passes through the evaporator in solution. It further reduces the amount of absorption liquid carried over from the absorber to the evaporator with the inert gas in the apparatus of the equalized pressure type.

Further, ethylene glycol is stable at high temperatures. It has a definite boiling point so that it cannot cause clogging by being dried out in accidentally over heated parts. Its freezing point is very low so that there is no danger of it crystallizing out in cold parts of the apparatus. Of course the presence of methylamine still further reduces the solidifying point of the mixture.

As an auxiliary gas in the last mentioned type of apparatus, I prefer hydrogen. The ultimate preferred group is methylamine as the refrigerant, an ethylene glycol, water mixture as absorption liquid and hydrogen as a pressure equalizing gas.

If desired, calcium chloride may be added to the absorption liquid mixture, in which case it would be preferable to also add some ammonium chloride or methylammonium chloride to prevent precipitation of calcium hydroxide.

The combination of methylamine and ethylene glycol or mixtures of ethylene glycol and water has particular advantages with air cooled absorption apparatus.

Besides the advantages above pointed out, ethylene glycol does not corrode iron.

Having thus described my invention, what I claim is:

1. A fluid group for use in a refrigerating system comprising a gaseous refrigerant and an absorption liquid therefor consisting of an ethylene glycol water mixture.

2. A fluid group for use in a refrigerating system comprising a gaseous refrigerant and an absorption liquid therefor comprising ethylene glycol.

3. A fluid group for use in a refrigerating system comprising methylamine and ethylene glycol.

4. A fluid group for use in a refrigerating system comprising methylamine and an absorption liquid therefor consisting of an ethylene glycol water mixture.

5. A fluid group for use in a refrigerating system comprising a gaseous refrigerant, an absorption liquid therefor consisting partly or wholly of ethylene glycol and a gas inert with respect to the refrigerant and the absorption liquid.

6. A fluid group for use in a refrigerating system comprising a gaseous refrigerant, an absorption liquid therefor consisting partly or wholly of ethylene glycol and hydrogen.

7. A fluid group for use in a refrigerating system comprising methylamine, ethylene glycol and hydrogen.

In testimony whereof he has affixed signature.

ROBERT SETH TAYLOR.